June 15, 1971   H. T. GERRY   3,584,997
SALT LAKE FERTILIZER COMPLEX
Filed June 21, 1968   3 Sheets-Sheet 1

United States Patent Office 3,584,997
Patented June 15, 1971

3,584,997
SALT LAKE FERTILIZER COMPLEX
Harold T. Gerry, Petersburg, Va., assignor to Allied
Chemical Corporation, New York, N.Y.
Filed June 21, 1968, Ser. No. 739,104
Int. Cl. C01b 25/10; C01f 5/14
U.S. Cl. 23—165                                    9 Claims

ABSTRACT OF THE DISCLOSURE

A cyclic process for the economic recovery of magnesium values and phosphoric acid from natural high sulfate brines and phosphate rock by successive evaporations of the brine to obtain salt precipitates and a brine containing magnesium chloride which is decomposed to magnesium oxide and hydrogen chloride. The hydrogen chloride is reserved for digestion of phosphate rock to yield phosphoric acid and calcium chloride solution which is utilized in one of the brine evaporation steps. This particular combination of steps assures recovery of most of the magnesium values of the brine and utilizes a net consumption of low cost natural brine to yield valuable phosphoric acid and thus effects many economies.

---

Figure 1:
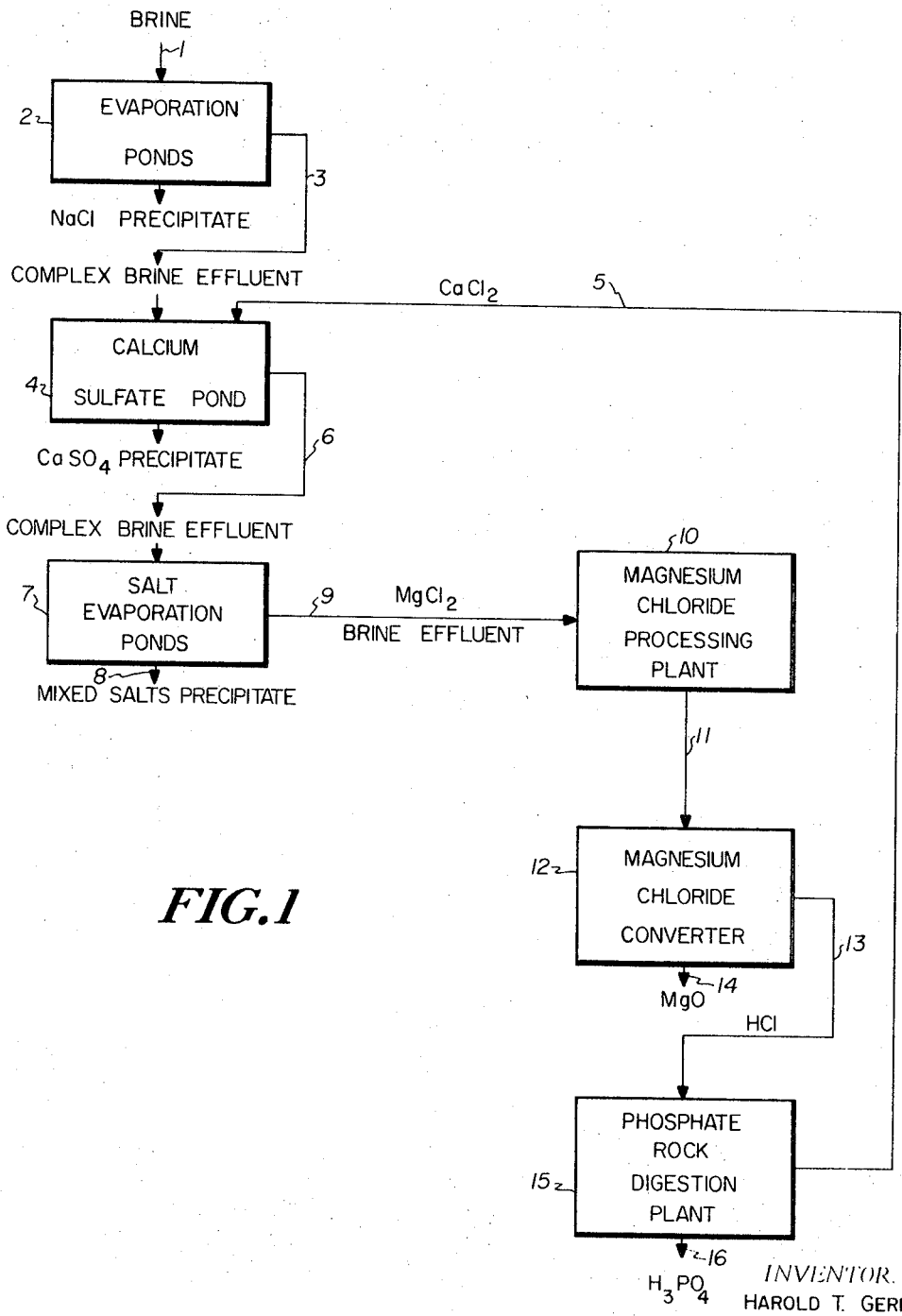
Figure 2:
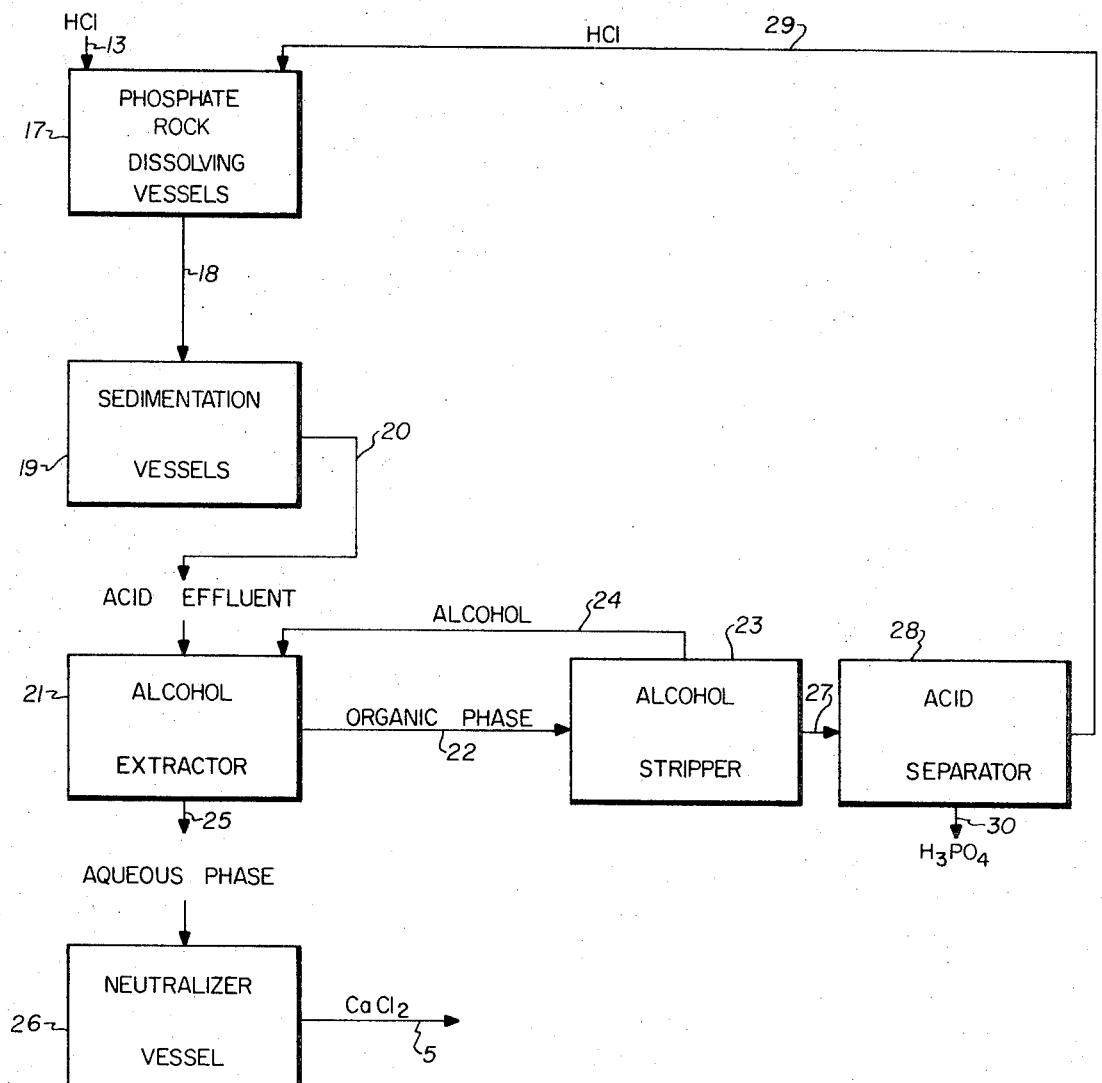

It is known to reduce the sulfate content of high sulfate brines, such as those found in the Great Salt Lake region of the United States and in Peru for example, prior to precipitation of potassium and magnesium salts in order to harvest practical quantities of magnesium and potassium.

Hadzeriga in U.S. Pat. 3,096,152, issued July 2, 1963 discloses a method for removing sulfate from brines containing potassium and magnesium chlorides by adding calcium chloride to precipitate the sulfate present as a complex salt of calcium sulfate, magnesium chloride and potassium chloride. However, excessive amounts of water are added in this process which must be evaporated later and large amounts of magnesium are lost. Recovery of potassium values in the brine is also low and thus this process has not been proven practical.

In another patent, U.S. Pat. 3,099,528, issued July 30, 1963, Hadzeriga discloses a method to recover magnesium and potassium salts from natural brines. Calcium chloride is used to precipitate the sulfates as calcium sulfate or gypsum which is treated by ion exchange to prepare sulfuric acid which is reserved for digestion of phosphate rock to prepare phosphoric acid used for fertilizers. The chief disadvantage of this process is the ion exchange step. This step requires expensive equipment and must be carried out at elevated temperatures, i.e. about 60–65° C. A cationic exchange resin is employed using hydrochloric acid as eluant.

A practical process for the preparation of phosphoric acid from phosphate rock combined with a brine evaporation process which is economical and which avoids the use of sulfuric acid as the phosphate rock acidulant is highly desirable.

Therefore, it is a principal object of the present invention to provide a practical, economical process for the recovery of fertilizer values from natural high sulfate brines and phosphate rock.

It is a further object to utilize hydrochloric acid as the acidulant for the digestion of phosphate rock.

It is another object to provide a process for the recovery of potassium and magnesium values from high sulfate natural brines.

Other objects and advantages will be apparent from the following detailed description thereof.

In accordance with the process of the present invention, natural brines containing at least 0.3% by weight of potassium calculated as potassium oxide, a calculated magnesium oxide to potassium oxide ratio of at least 1.5:1 and a sulfate to magnesium oxide ratio of at least 0.25:1 are processed in a series of evaporation ponds to yield, in addition to sodium chloride and potassium chloride, calcium sulfate precipitated by adding calcium chloride to the brine and a sulfate-free magnesium chloride brine. The latter is processed to obtain magnesium oxide and hydrogen chloride which is utilized to acidulate phosphate rock. Phosphoric acid and a calcium chloride solution is obtained. The latter is recycled to the brine processing.

The overall process can be illustrated by a series of equations as follows:

(1)  $\text{Brine} + \text{CaCl}_2 \rightarrow \text{CaSO}_4 + \text{MgCl}_2$
(2)  $\text{MgCl}_2 + \text{H}_2\text{O} \rightarrow \text{MgO} + \text{HCl}$
(3)  $\text{HCl} + \text{phosphate rock} \rightarrow \text{H}_3\text{PO}_4 + \text{CaCl}_2$ By combining these three equations, it is apparent that the overall equation for the process is:

(4)  $\text{Brine} + \text{phosphate rock} + \text{H}_2\text{O} \rightarrow \text{H}_3\text{PO}_4 + \text{CaSO}_4 + \text{MgO}$ In effect, low cost brines are substituted for high cost sulfuric acid in the acidulation of phosphate rock, which contributes markedly to the economies of the present process. In addition to sodium chloride and potassium chloride, substantially all of the magnesium values present in the original brine are recovered. The utilization of the normally unmarketable calcium chloride solution from the phosphate plant in the brine evaporation process to form gypsum also adds materially to the advantages of the present process.

The process can be further illustrated by the accompanying drawings. FIG. I is a flow diagram of the process as a whole. FIG. II is a flow diagram of the phosphate rock digestion plant in greater detail. FIG. III is a flow diagram of the preferred process using Great Salt Lake brine.

Referring now to FIG. I, a high sulfate brine as described hereinabove is fed through line 1 into one or more evaporation ponds 2. The water in the brine is evaporated by solar evaporation to effect precipitation of a substantially pure sodium chloride. The evaporation is halted before appreciable quantities of other salts begin to precipitate. This solar evaporation and subsequent evaporations are carried out at temperatures of from about 0° to about 50° C., preferably from about 20° to about 40° C. This first evaporation yields a sodium chloride precipitate and a complex brine effluent.

The complex brine effluent, in addition to residual sodium chloride, contains potassium chloride, magnesium chloride, sodium sulfate and water. This brine is led through line 3 to the calcium sulfate pond 4. Calcium chloride is also added to this pond through line 5 in sufficient amount to react with all of the sulfate present in the brine. The calcium chloride can be added prior to, concurrently with, or after the brine is added to the pond. Suitably the calcium chloride solution contains from about 5 to about 35% of calcium chloride. (Percentages as referred to throughout the specification are by weight.)

The combined solutions in the calcium sulfate pond 4 are subjected to an other evaporation to precipitate substantially all of the calcium sulfate present and yield a complex brine effluent close to saturation with potassium compounds.

The complex brine effluent from the calcium sulfate pond 4 is lead through line 6 to one or more salt evaporation ponds 7 wherein essentially all of the residual sodium chloride and the potassium chloride are precipitated and harvested through line 8. The effluent brine from pond 7 is principally magnesium chloride.

The magnesium chloride brine is led through line 9 to the magnesium chloride processing plant 10 where the magnesium chloride brine is concentrated to remove water. The concentrated magnesium chloride is led through line 11 to the magnesium chloride converter 12 were magnesium chloride is converted to magnesium oxide harvested through line 14. Hydrogen chloride is fromed as by-product in the converter 12 and is removed and used in the phosphate rock digestion plant 15.

According to one procedure, the magnesoum chloride brine in line 9 is fed to the processing plant 10 where it is concentrated and dried to form a dry magnesium chloride flake. The dry flakes are fed through line 11 to the converter 12 which is a decomposition kiln. The magnesium chloride is decomposed to magnesium oxide by heating at 450–950° C. The solid product contains at least 80% of magnesium oxide. The magnesium oxide is drawn off at intervals. The product can be purified further by water washing to remove residual salts. The vapors from the converter 12 contain 10–20% by volume of hydrogen chloride and from 15–30% by volume of water. The vapors are collected in line 13 and cooled to 90–120°C.

In an alternative procedure the magnesium chloride brine in line 9 is fed to the magnesium chloride processing plant 9 where the brine is concentrated to a slurry or concentrated solution. This product is led through line 11 to the magnesium chloride converter 12 which contains a fluidized bed of magnesium oxide particles. These particles are maintained in a fluidized state by upward passage of hot gases. Generally the temperatures of the gases can range from about 600° C. to about 1100° C., preferably from about 700° C. to about 800° C. During processing, the magnesium chloride solids coat the magnesium oxide particles and are converted to magnesium oxide. Hydrogen chloride vapors form as by-product. The particles of magnesium oxide increases in size and agglomerate as coating continues and eventually drop out of the fluidized bed and are recovered through line 14. The hydrogen chloride vapors are collected in line 13.

The hydrogen chloride in line 13 is passed to the phosphate rock digestion plant 15 to prepare phosphoric acid and calcium chloride solution in known manner. The phosphoric acid is collected through line 16. The calcium chloride is recycled through line 5 to the calcium sulfate pond 4.

FIG. II is a flow diagram of a suitable phosphate rock digestion plant in detail. Ground phosphate rock containing about 20–35% phosphorus pentoxide and about 25–50% calcium oxide is added to one or more dissolving vessels 17 together with water so that the ratio by weight of phosphate rock to water is from about 1:1 to about 6:1. The hydrogen chloride in line 13 from the magnesium oxide reactor is contacted withe the phosphate slurry so that the ratio by weight of phosphate rock to hydrogen chloride is from about 1:0.7 to about 1:0.3. The temperature in the vessel 17 is maintained at about 80–120° C. preferably at about 90–110° C. during dissolution to avoid execessive dilution from condensing water. One or more vessels may be connected in series so that a reaction time of about 10–30 minutes is obtained. The resultant slurry is passed through line 18 to one or more sedimentation vessels 19 where the insoluble residue is allowed to settle out.

The resultant acid effluent solution which contains about 10–30% of phosphoric acid and about 20–40% of calcium chloride is led through line 20 to an alcoholic extractor 21. A water insoluble solvent, preferably, a primary aliphatic alcohol of 4 to 7 carbon atoms, such as butanol or isoamyl alcohol, is used to extract the phosphoric acid from the solution. A ratio of about 5 to about 20 parts of alcohol for each part of phosphoric acid is maintained in the extractor 21. The aqueous and the organic phases are allowed to separate and are treated separately. The organic phase, containing the phosphoric acid and some hydrochloric acid, is passed through line 22 to an alcohol stripper 23. The phosphoric and hydrochloric acid are separated from the alcohol by countercurrent extraction with water in a weight ratio of from about 0.5:4 to about 3:1 parts of water per part of alcohol. The alcohol is recycled through line 24 to the alcohol extractor 21 for use in a succeeding cycle of operation.

The aqueous phosphoric acid solution from the alcohol stripper 23 is collected in line 27 and led to the acid separator 28. The acid solution is concentrated to contain about 60% of phosphoric acid whereby hydrogen chloride is evaporated and is collected in line 29 for recycle to the phosphate rock digestion step. The phosphoric acid product is collected in line 30.

The aqueous raffinate phase from the alcohol extractor 21 is led through line 25 to a neutralizer vessel 26 to recover calcium chloride. Any residual alcohol is stripped and recycled to the alcohol extractor 21 (not shown). The solution containing about 10 to 30% of calcium chloride is treated with lime in the neutralizer vessel 26 to neutralize any acid impurities and precipitate any aluminum or iron impurities as their hydroxides. The purified calcium chloride solution is collected in line 5 for recycling to the brine evaporation process.

The evaporation steps can be modified depending upon the composition of the starting brine. The sulfate content of natural brines varies according to place of origin and also with the temperature. For example, the sulfate content of Great Salt Lake brine is less during the winter months, and withdrawal during colder weather will ensure a relatively low sulfate content. For brines containing relatively high proportions of sulfate, an additional evaporation step can be carried out prior to the addition of calcium chloride. This evaporation yields astrakanite ($Na_2SO_4 \cdot MgSO_4 \cdot H_2O$) and thus a large portion of sulfate ions are removed in this step. The resultant complex brine effluent is then treated with calcium chloride as described above.

Depending on the relative proportions of potassium, sodium and magnesium ions in the complex brine effluent from the calcium sulfate pond, one or more evaporations can be carried out. For example, when the brine contains from 13–25% of magnesium chloride, 2–10% of sodium chloride, 3–9% of potassium chloride and 60–80% of water, evaporation of from 25–45% of the water present will precipitate a mixture of sodium chloride and potassium chloride. The effluent brine will contain from 20–35% of magnesium chloride, 1–3% of sodium chloride and 2–5% of potassium chloride in addition to 50–80% of water.

Evaporation of this brine will precipitate carnallite ($KCl \cdot MgCl_2 \cdot 6H_2O$). The effluent brine is principally magnesium chloride.

Additional economies in the present process can be effected by treating the carnallite precipitate with water to form an aqueous solution of magnesium chloride and a potassium chloride precipitate. The magnesium chloride solution can be reserved and added to the carnallite pond in a succeeding cycle of operation or can be added to the main magnesium chloride stream.

The solids remaining in the various ponds are harvested at suitable intervals to recover the salts. The mixed sodium chloride and potassium chloride salts can be separated by conventional flotation or crystallization techniques to recover the potassium values in the brine.

Figure 3:
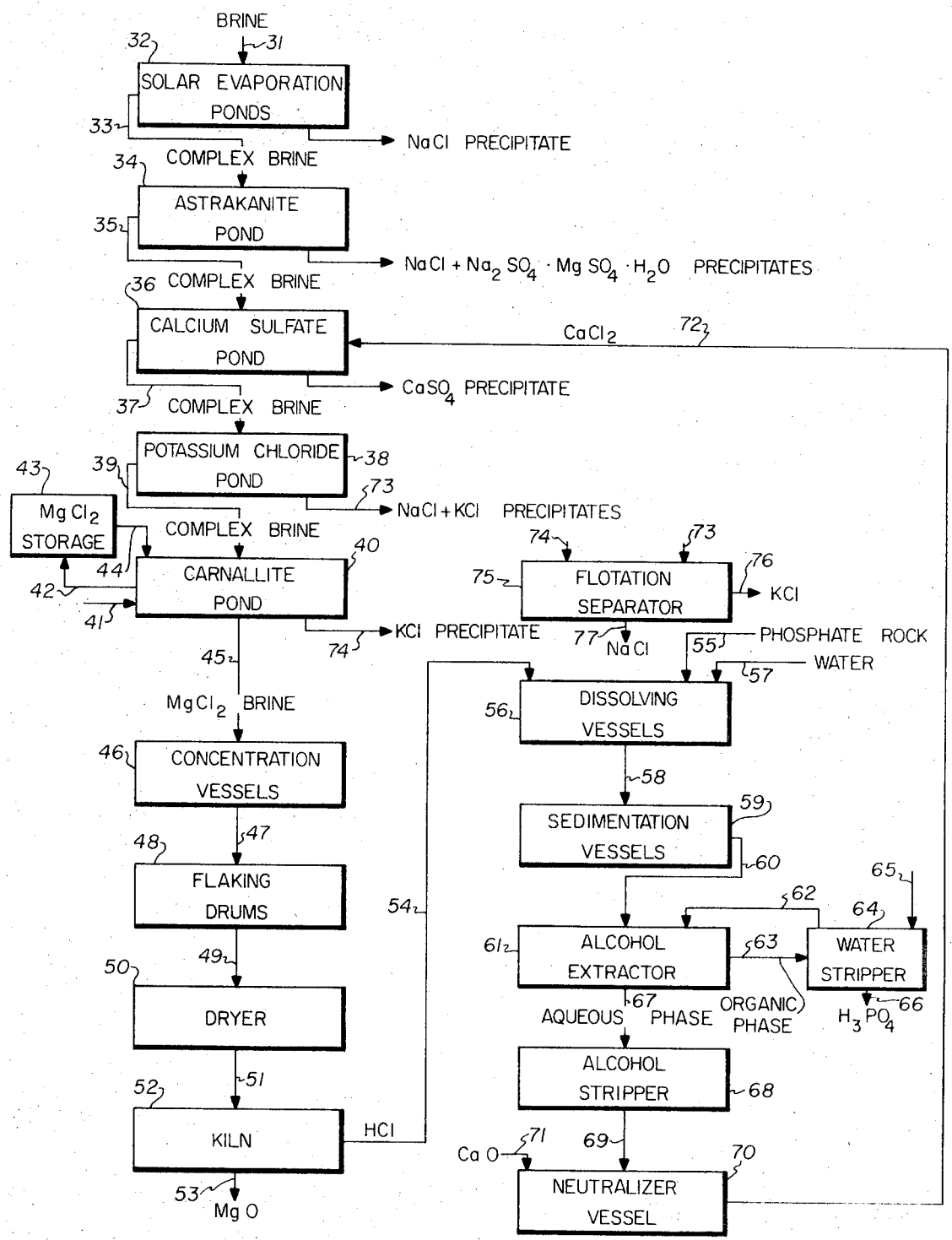

The invention will be further illustrated by reference to FIG. 3 in the following example utilizing Great Salt Lake brine, but the invention is not meant to be limited to the details disclosed therein and other brines in accordance with the description disclosed hereinabove may be substituted. In the examples all parts and percentages are by weight unless otherwise noted. Data is for operation at about 20–25° C.

EXAMPLE 1

44.2 parts of Great Salt Lake brine was fed through line 31 to a series of five solar evaporating ponds 32 covering a total area of about 4.31 square miles. The initial brine composition was as follows:

|  | Parts | Percent |
| --- | --- | --- |
| NaCl | 8.78 | 19.8 |
| KCl | 0.42 | 0.9 |
| $MgCl_2$ | 1.45 | 3.3 |
| $Na_2SO_4$ | 1.26 | 2.8 |
| $H_2O$ | 32.26 | 73.0 |

After solar evaporation of 23.62 parts of water, 8.08 parts of solid crystallized which had the following composition:

|  | Parts | Percent |
| --- | --- | --- |
| NaCl | 9.08 | 91.8 |
| KCl | 0.02 | 0.2 |
| $MgCl_2$ | 0.07 | 0.9 |
| $Na_2SO_4$ | 0.06 | 0.7 |
| $H_2O$ | 0.57 | 6.4 |

The effluent solution from the ponds contained the following:

|  | Parts | Percent |
| --- | --- | --- |
| NaCl | 0.70 | 5.9 |
| KCl | 0.40 | 3.1 |
| $MgCl_2$ | 1.39 | 11.6 |
| $Na_2SO_4$ | 1.21 | 10.4 |
| $H_2O$ | 8.25 | 69.0 |

This solution was fed through line 33 to a pond 34 covering a 0.74 square mile area where 3.23 parts of water were evaporated to crystallize a mixture of salts containing astrakanite. The solids had the following composition:

|  | Parts | Percent |
| --- | --- | --- |
| NaCl | 0.70 | 47.9 |
| KCl | 0.01 | 0.7 |
| $MgCl_2$ | 0.03 | 2.0 |
| $Na_2SO_4$ | 0.02 | 1.4 |
| Astrakanite | 0.60 | 41.1 |
| $H_2O$ | 0.10 | 6.9 |

The effluent solution had the following composition:

|  | Parts | Percent |
| --- | --- | --- |
| NaCl | 0.01 | 1.4 |
| KCl | 0.39 | 5.5 |
| $MgCl_2$ | 1.19 | 16.8 |
| $Na_2SO_4$ | 0.69 | 9.7 |
| $H_2O$ | 4.79 | 66.6 |

This solution was passed through line 35 to a pond 36 covering 0.39 square mile containing a calcium chloride solution (0.537 part of calcium chloride and 2.15 parts of water) fed through line 72. After evaporation of 1.94 parts of water, a solid crystallized having the following composition:

|  | Parts | Percent |
| --- | --- | --- |
| NaCl | 0.22 | 19.1 |
| KCl | 0.01 | 0.9 |
| $MgCl_2$ | 0.02 | 1.7 |
| Gypsum | 0.83 | 72.2 |
| $H_2O$ | 0.07 | 6.1 |

The effluent solution from this pond had the following composition:

|  | Parts | Percent |
| --- | --- | --- |
| NaCl | 0.347 | 5.2 |
| KCl | 0.386 | 5.8 |
| $MgCl_2$ | 1.176 | 17.7 |
| $H_2O$ | 4.74 | 71.3 |

This solution was fed through line 37 to another pond 38 where 1.61 parts of water were evaporated. A solid precipitated having the following composition:

|  | Parts | Percent |
| --- | --- | --- |
| NaCl | 0.27 | 48.2 |
| KCl | 0.25 | 44.7 |
| $MgCl_2$ | 0.01 | 1.8 |
| $H_2O$ | 0.03 | 5.3 |

The effluent solution from this pond had the following composition:

|  | Parts | Percent |
| --- | --- | --- |
| NaCl | 0.076 | 1.7 |
| KCl | 0.138 | 3.2 |
| $MgCl_2$ | 1.163 | 26.0 |
| $H_2O$ | 3.094 | 69.2 |

This solution was fed through line 39 to another pond 40 where 0.92 part of water was evaporated. Carnallite precipitated and the effluent solution had the following composition:

|  | Parts | Percent |
| --- | --- | --- |
| NaCl | 0.023 | 0.6 |
| KCl | 0.026 | 0.7 |
| $MgCl_2$ | 1.156 | 31.8 |
| $H_2O$ | 2.434 | 66.9 |

After draining the pond through line 45, 0.27 part of water was added through line 41 to the pond to decompose the carnallite and form a magnesium chloride solution. This solution was led from the storage tank 43 through line 44 back to the pond 40. The solids remaining in the pond had the following composition:

|  | Parts | Percent |
| --- | --- | --- |
| NaCl | 0.052 | 29.2 |
| KCl | 0.112 | 62.9 |
| $MgCl_2$ | 0.004 | 2.2 |
| $H_2O$ | 0.010 | 5.7 |

The solids from pond 38 and pond 40 after decomposition of the carnallite were passed through line 73 and 74 respectively and collected in the flotation separator 75. The potassium chloride and sodium chloride were separated by flotation according to a method described by Robert Noyes in "Potash and Potassium Fertilizers," 1966. The potassium chloride is drawn off through line 76 and is suitable for use as a fertilizer directly. The sodium chloride is drawn off through line 77.

The magnesium chloride brine obtained from pond 40 contained 31.7% of magnesium chloride, 1.3% of impurities and 67.0% water. 2.362 parts of this brine was led through line 45 to steel steam-heated concentration vessels 46 lined with acid proof brick where the brine was concentrated to contain 49.5% of magnesium chloride. The concentrated brine was passed through line 47 to a series of three water-cooled steel flaking drums 48. Flakes of magnesium chloride hydrate produced on the drums were fed through line 49 to a hot-air dryer 50 operating at about 110° C. to 120° C. where the water content was further reduced to give a solid containing 63% of magnesium chloride. These flakes were fed through line 51 to a decomposition kiln 52 operating at a solids discharge temperature if 540° C. A gas burner at the feed end of the kiln supplied the heat. The gas discharge temperature was about 700° C.

The solid product drawn off through line 53 from the kiln 52 contained about 80.0% magnesium oxide.

The combined gases from the kiln 52, containing about 13% by volume of hynrogen chloride and 22.4% by volume of water, were collected in line 54 and cooled to about 110° C.

About 0.61 part of ground phosphate rock containing 31.28% of phosphorous pentoxide and 45.33% of calcium oxide was fed through line 55 to a series of three rubber-lined dissolving vessels 56 fitted with stirring means. 2.0 parts of water were added through line 57 and 0.5 part of hydrogen chloride from line 54 was added at about 110° C. The reaction temperature was maintained at about 90° C. The reaction time in the dissolving vessels 56 was about 15 minutes. The slurry was passed through line 58 to a series of sedimentation vessels 59 where the solids were allowed to settle out. The raffinate stream from the sedimentation vessels 59 was collected in line 60 and contained 0.23 part of phosphoric acid and 0.54 part of calcium chloride.

The solution in line 60 was passed to a countercurrent alcohol extractor 61 where the solution was extracted with 2 parts of isoamyl alcohol added through line 62. The aqueous and organic layers were allowed to separate. The organic phase containing phosphoric acid was led through line 63 to a water stripper 64 where the phosphoric acid was recovered from the organic layer by extraction with 1.0 part of water added through line 65. 0.21 part of phosphoric acid was obtained through exit line 66.

The aqueous phase from the alcohol extractor 61 was passed through line 67 to an alcohol stripper 68 where residual alcohol was removed. The solution from the stripper 68 was led through line 69. It contained 0.53 part of calcium chloride, 0.01 part of hydrochloric acid and 0.01 part of phosphoric acid. The solution in line 66 was led to neutralization tank 70 where sufficient lime was added through line 71 to neutralize the acid present and precipitate any metal impurities present as their hydroxides. The raffinate calcium chloride solution was drawn off through line 72 and recycled to the pond 36.

It is to be noted that the ratio of potassium values produced according to the above-described process is limited by the sulfate:potassium content of the original brine. The yield of potassium is increased by removing as much sulfate as is practical before adding calcium chloride in the calcium sulfate ponds. Thus according to the above-preferred process, sulfates are precipitated in the astrakanite pond before adding calcium chloride. However, this step is not always required. For example, at low winter temperatures of 0–10° C., a solid sodium sulfate decahydrate crystallizes from the brine and thus brine obtained under winter conditions will contain less sulfate and the sulfate to potassium ratio of the brine may be as much as 70% less than that obtained under summer atmospheric conditions. Example 2 illustrates that the effluent brine from the first evaporation can be passed directly to the calcium sulfate pond.

EXAMPLE 2

25.1 parts of Great Salt Lake brine was fed to a series of five evaporating ponds covering an area of about 2.45 sq. miles. This brine had the following composition:

|  | Parts | Percent |
| --- | --- | --- |
| NaCl | 4.99 | 19.9 |
| KCl | 0.24 | 0.9 |
| $MgCl_2$ | 0.83 | 3.3 |
| $Na_2SO_4$ | 0.72 | 2.9 |
| $H_2O$ | 18.33 | 73.0 |

After evaporating 13.32 parts of water, a precipitate formed having the following composition:

|  | Parts | Percent |
| --- | --- | --- |
| NaCl | 4.59 | 92.0 |
| KCl | 0.01 | 0.2 |
| $MgCl_2$ | 0.04 | 0.8 |
| $Na_2SO_4$ | 0.03 | 0.6 |
| $H_2O$ | 0.32 | 6.4 |

The effluent solution had the following composition:

|  | Parts | Percent |
| --- | --- | --- |
| NaCl | 0.399 | 5.9 |
| KCl | 0.227 | 3.3 |
| $MgCl_2$ | 0.790 | 11.6 |
| $Na_2SO_4$ | 0.687 | 10.0 |
| $H_2O$ | 4.686 | 96.2 |

This was fed to a pond containing calcium chloride solution as in Example 1. 3.67 parts of water were evaporated and a solid formed which had the following composition:

|  | Parts | Percent |
| --- | --- | --- |
| NaCl | 0.781 | 43.1 |
| KCl | 0.009 | 0.5 |
| $MgCl_2$ | 0.030 | 1.7 |
| Gypsum | 0.833 | 48.2 |
| $H_2O$ | 0.114 | 6.5 |

The effluent solution had the following composition:

|  | Parts | Percent |
| --- | --- | --- |
| NaCl | 0.185 | 4.6 |
| KCl | 0.219 | 5.4 |
| $MgCl_2$ | 0.760 | 18.8 |
| $H_2O$ | 2.875 | 71.2 |

This solution was fed to another pond where 0.851 part of water was evaporated. The precipitated solids had the following composition:

|  | Parts | Percent |
| --- | --- | --- |
| NaCl | 0.135 | 46.7 |
| KCl | 0.129 | 44.6 |
| $MgCl_2$ | 0.007 | 2.5 |
| $H_2O$ | 0.018 | 6.2 |

The effluent solution had the following composition:

|  | Parts | Percent |
| --- | --- | --- |
| NaCl | 0.049 | 1.7 |
| KCl | 0.089 | 3.1 |
| $MgCl_2$ | 0.753 | 26.0 |
| $H_2O$ | 2.005 | 69.2 | was fed to another pond where 0.596 part of water was evaporated. Carnallite precipitated. The effluent solution contained the following:

|  | Parts | Percent |
| --- | --- | --- |
| NaCl | 0.015 | 0.6 |
| KCl | 0.017 | 0.7 |
| $MgCl_2$ | 0.751 | 31.8 |
| $H_2O$ | 1.578 | 66.9 |

This magnesium chloride solution was treated as in Example 1 to form magnesium oxide and hydrochloric acid.

After draining the pond, 0.176 part of water was added to decompose the carnallite solids. The liquid was reserved. The solids had the following compositions:

|       | Parts | Percent |
|-------|-------|---------|
| NaCl  | 0.034 | 29.0    |
| KCl   | 0.073 | 62.4    |
| MgCl₂ | 0.003 | 2.7     |
| H₂O   | 0.007 | 5.9     |

These solids are processed as in Example 1 to separate sodium chloride from potassium chloride.

EXAMPLE 3

This example demonstrates the alternate treatment of the magnesium chloride brine obtained from the carnallite pond 40 in FIG. III using a fluidized bed reactor.

The magnesium chloride brine was concentrated in a concentration vessel to contain 49.5% of magnesium chloride. The resultant brine was sprayed at the rate of 59 lbs./hr. for 90 hours into a fluid bed reactor having a cross sectional area of 1.77 sq. ft. Initially the bed contained 1000 lbs. of 96% magnesium oxide particles having a particle size of about 300 to 2000 microns. The bed was maintained at a temperature of about 925° C. with hot gases obtained by burning 15 s.c.f.m. of gas mixed with 180 s.c.f.m. of air in a preheater section. As the bed particles became enlarged and dropped from the bed, additional magnesium oxide particles were added at a rate of about 2 lbs./hr. of brine solids added.

At the end of the operation, 3800 lbs. of crude magnesium oxide containing 83% of magnesium oxide were collected. The crude product was washed with water at 95° C. three times. The resultant product contained 99% of magnesium oxide.

The hot gases exiting from the bed were conducted through a cyclone separator to remove any fine solids. The gas containing 1.7 volume percent of hydrogen chloride was reserved for digestion of phosphate rock.

It will be apparent that many modifications and variations may be effected without departing from the novel concepts of the invention, and the illustrative details disclosed are not to be construed as imposing undue limitations on the invention.

I claim:
1. A process for recovering magnesium values and phosphoric acid from natural high sulfate brines and phosphate rock which comprises:
  (a) evaporating the natural brine to yield a substantially pure sodium chloride precipitate and a complex effluent brine;
  (b) adding calcium chloride to the effluent brine obtained in step (a) to precipitate the sulfate ions in the brine as calcium sulfate and yield a complex effluent brine;
  (c) evaporating the complex effluent brine obtained in step (b) to precipitate salts and yield magnesium chloride effluent brine;
  (d) treating the magnesium chloride effluent brine at elevated temperatures to yield magnesium oxide solids and hydrogen chloride;
  (e) acidulating phosphate rock with the hydrogen chloride obtained in step (d) to yield phosphoric acid and an aqueous calcium chloride solution;
  (f) recycling the aqueous calcium chloride solution obtained in step (e) to step (b).

2. The process according to claim 1 wherein the brine contains at least 0.3% of potassium as potassium oxide, a magnesium oxide to potassium oxide ratio of at least 1.5:1 and a sulfate to magnesium oxide ratio of at least 0.25:1.

3. The process according to claim 1 wherein an additional evaporation is carried out between steps (a) and (b) to precipitate astrakanite.

4. The process according to claim 1 wherein the brine contains about 20% sodium chloride, about 1% potassium chloride, about 3% magnesium chloride, about 3% sodium sulfate, and about 73% water.

5. The process according to claim 4 wherein the brine from step (b) is treated in the following additional steps:
  (g) evaporating the brine to yield a carnallite precipitate and magnesium chloride effluent brine;
  (h) adding water to the carnallite precipitate to decompose it to yield a potassium chloride precipitate and a solution of magnesium chloride;
  (i) recycling the magnesium chloride solution obtained in step (h) to the evaporation step (g);
  (j) combining the mixed alkali metal chloride precipitate and the precipitate obtained in step (h) and separating potassium chloride from the mixed salts;

6. The process according to claim 1 wherein the evaporations are carried out at temperatures of from about 0° C. to about 50° C.

7. The process according to claim 1 wherein phosphoric acid and aqueous calcium chloride are obtained in step (e) by contacting ground phosphate rock at a temperature of 80 to 120° C. with the hydrogen chloride obtained in step (d) for from about 10 to 30 minutes, separating the solution from the insoluble residue, extracting the solution with an insoluble primary aliphatic alcohol of 4 to 7 carbon atoms, separating the organic phase from the aqueous raffinate phase, stripping the phosphoric acid from the organic phase with water and collecting the resultant aqueous phosphoric acid solution, treating the aqueous raffinate phase to remove residual alcohol, neutralizing residual acids, and reserving the resultant calcium chloride solution for use in step (b).

8. The process according to claim 1 wherein magnesium oxide is obtained in step (d) by concentrating the magnesium chloride brine obtained in step (c) to remove water, and decomposing the magnesium chloride in a fluidized bed reactor to magnesium oxide and hydrogen chloride.

9. A process for recovering magnesium values and phosphoric acid from natural high sulfate brines and phosphate rock which comprises:
  (a) evaporating the natural brine to yield a substantially pure sodium chloride precipitate and a complex effluent brine containing residual sodium chloride, potassium chloride, magnesium chloride, sodium sulfate and water, said natural brine containing at least 0.3% of potassium measured as potassium oxide, a magnesium oxide to potassium oxide ratio of at least 1.5:1 and a sulfate to magnesium oxide ratio of at least 0.25:1;
  (b) adding calcium chloride to the effluent brine obtained in step (a) and evaporating to precipitate the sulfate ions in the brine as calcium sulfate and yield a complex effluent brine, said calcium chloride being added in amount sufficient to react with all of the sulfate present in the brine;
  (c) evaporating the complex effluent brine obtained in step (b) to precipitate residual sodium chloride and potassium chloride and yield magnesium chloride effluent brine;
  (d) concentrating the magnesium chloride effluent brine to remove water;
  (e) decomposing the magnesium chloride obtained in step (d) in a fluidized bed of magnesium oxide particles maintained in a fluidized state by upward passage of combustion gases at a temperature of about 600–1000° C. To yield magnesium oxide solids and hydrogen chloride mixed with the combustion gases;
  (f) acidulating an aqueous slurry of ground phosphate rock at a temperature of 80 to 120° C. with the mixture of hydrogen chloride and combustion gases obtained in step (e) to yield an aqueous solution containing phosphoric acid and calcium chloride and an insoluble residue;

(g) separating the solution containing phosphoric acid and calcium chloride from the insoluble residue;

(h) extracting the solution containing phosphoric acid and calcium chloride with a water-insoluble primary aliphatic alcohol of 4 to 7 carbon atoms to form an alcohol phase containing phosphoric acid and an aqueous raffinate phase containing calcium chloride;

(i) separating the alcohol phase from the aqueous raffinate phase;

(j) stripping the aqueous raffinate phase to remove residual alcohol;

(k) neutralizing the aqueous raffinate phase to precipitate aluminum and iron impurities as hydroxides;

(l) recycling the resultant aqueous raffinate phase containing calcium chloride to step (b);

(m) stripping the phosphoric acid from the alcohol phase with water;

(n) collecting the resultant aqueous phosphoric acid solution; and (o) recycling the resultant stripped alcohol phase to step (h).

References Cited
UNITED STATES PATENTS

| | | | |
|---|---|---|---|
| 3,099,528 | 7/1963 | Hadzeriga | 23—89 |
| 3,432,258 | 3/1969 | Ferris | 23—91 |
| 3,481,702 | 12/1969 | Moore et al. | 23—201 |

OTHER REFERENCES

MgO: First High Purity Source, Chemical Engineering, August 1956, 142, 144, 346–349.

OSCAR R. VERTEZ, Primary Examiner

G. H. HELLER, Assistant Examiner

U.S. Cl. X.R.

23—91, 122, 154, 201

UNITED STATES PATENT OFFICE
CERTIFICATE OF CORRECTION

Patent No. 3,584,997          Dated   June 15, 1971

Inventor(s)   Harold T. Gerry

It is certified that error appears in the above-identified patent and that said Letters Patent are hereby corrected as shown below:

Column 2, line 63, "an other" should read -- another --. Column 3, line 6, "were" should read -- where --; line 8, "fromed" should read -- formed --; line 10, "magnesoum" should read -- magnesium --. Column 6, line 24, "3.2" should read -- 3.1 --. Column 7, line 3, "if" should read -- of --; line 9, "hynrogen" should read -- hydrogen --. Column 8, line 18, "96.2" should read -- 69.2 --.

Signed and sealed this 23rd day of November 1971.

(SEAL)
Attest:

EDWARD M.FLETCHER,JR.          ROBERT GOTTSCHALK
Attesting Officer              Acting Commissioner of Patents